United States Patent
Dieckmann et al.

(10) Patent No.: US 6,250,043 B1
(45) Date of Patent: Jun. 26, 2001

(54) METHOD FOR LAYING FLOOR COVERINGS ON GROUNDS

(75) Inventors: Ernst Dieckmann, Osnabruck; Horst-Friedrich Schliffke, Steinfurt-Burgsteinfurt; Ralf Hummelt, Ostbevern, all of (DE)

(73) Assignee: Wulffe GmbH U. CO., Lotte (DE)

( * ) Notice: Subject to any disclaimer, the term of this patent is extended or adjusted under 35 U.S.C. 154(b) by 0 days.

(21) Appl. No.: 09/235,154

(22) Filed: Jan. 22, 1999

(30) Foreign Application Priority Data

Jan. 23, 1998 (DE) .............................................. 198 02 602
Jun. 4, 1998 (DE) .............................................. 198 25 058

(51) Int. Cl.$^7$ .................................................. E04G 21/00
(52) U.S. Cl. ..................................... 52/741.41; 52/745.21; 52/391
(58) Field of Search ........................ 52/390, 391, 741.41, 52/745.21, 746.1, 746.12, 747.11; 106/711

(56) References Cited

U.S. PATENT DOCUMENTS

| | | | |
|---|---|---|---|
| 2,430,987 | * | 11/1947 | Lindner et al. ............... 52/390 |
| 2,934,932 | * | 5/1960 | Wagner ..................... 52/747.12 |
| 4,286,992 | * | 9/1981 | Galer et al. ................... 106/696 |
| 5,718,759 | * | 2/1998 | Stav et al. .................... 106/735 |
| 5,858,083 | * | 1/1999 | Stav et al. .................... 106/735 |
| 6,012,261 | * | 1/2000 | McDonald ................... 52/506.01 |
| 6,080,234 | * | 6/2000 | Clavaud et al. .............. 106/644 |
| 6,099,638 | * | 8/2000 | Garcia ........................ 106/724 |

FOREIGN PATENT DOCUMENTS

| | | |
|---|---|---|
| 2626126 | 6/1976 | (DE) . |
| 3028559 | 7/1980 | (DE) . |
| 3527982 | 8/1985 | (DE) . |
| 3938075 | 11/1989 | (DE) . |
| 19620176 | 5/1996 | (DE) . |
| 19721060 | 5/1997 | (DE) . |
| 19731485 | 7/1997 | (DE) . |

OTHER PUBLICATIONS

Ullmann Enzyklopadie der technischen Chemie, vol. 7, p. 111–117.
Anlage a) Klingenberger, Textile Floor Coverings, 1997.
Anlage b) GEV–Einstufungskriterien, 1997.
Anlage c) Rompp Chemie–Lexikon, 1997, p. 1207.
Anlage d) Rompp Chemie–Lexikon, 1993, p. 3645.
Anlage e) Rompp Chemie–Lexikon, 1992, pp. 5115–5117.

* cited by examiner

*Primary Examiner*—Beth A. Stephan
*Assistant Examiner*—Brian E. Glessner
(74) *Attorney, Agent, or Firm*—Dennison, Scheiner, Schultz & Wakeman

(57) ABSTRACT

The invention relates to a method for laying floor coverings on sub-floors using a fast-setting thin screed, in which case one mixes a primer of the expanding cement-type K with 2, 3, 4, 5-tetrahydroxyadipic acid and either admixes latexed, ground hard fibers in combination with glass and/or polymerisate fibers as well as furthermore aminoacid-polycondensation fibers and polyurethane foam, adds to the entire substance a dispersion of a butadiene/styrene-copolymerisate containing carboxyl groups, dilutes the mixture with water, applies it to the sub-floor and allows it to dry and then one applies an aqueous synthetic resin dispersion with a water content of not more than 15% and lays the floor covering thereon or the primer material mixed with the 2, 3, 4, 5-tetrahydroxyadipic acid is diluted with water, the mixture is applied to the sub-floor and a mechanical, adhesive-free bond is brought about between the floor covering and sub-floor by providing a mixture, projecting from the sub-floor, or a) latexed, ground hard fibers, b) 0 to 100%, with respect to the weight of the hard fibers, of glass fibers and/or polymerisate fibers, c) aminoacid polycondensation fibers and d) polyurethane foam.

14 Claims, 1 Drawing Sheet

METHOD FOR LAYING FLOOR COVERINGS ON GROUNDS

BACKGROUND OF THE INVENTION

The invention relates to a method for laying floor coverings on sub-floors.

Until the forties of the twentieth century houses were conventionally built with heavy solid stone and heavy wooden beam floors. Their great weight and this type of construction of the residential dividing walls and residential dividing floors guarantee adequate sound insulation. The "heavy" construction was replaced at the end of the forties by lighter construction materials and solid floors (concrete floors). The requirements of footfall sound-proofing are largely not achieved by these building materials according to DIN 4109. Therefore, in the case of normal solid construction, the use of a floating screed (for example a cement screed of at lest 45 mm on a standardised, soft springy sound-insulating foundation between the concrete floor and screed sheet according to DIN 18 164, Part 2: synthetic foam materials—sound-insulating materials for footfall sound-proofing and DIN 18 165, Part 1: fibrous sound insulating materials—sound-insulating materials for footfall sound-proofing) represent the rule of the technology.

Adequately high sound-proofing is achieved by this two-sheet system. The basis of the sound-insulating materials according to DIN 18 164 and DIN 18 165 is represented by polystyrene, rubber, mineral fibres and the like, in which case contacts of sounds conducted through solids to the structure must be avoided above all in the wall connection region.

The footfall sound-proofing index TSM to be expected with floating screeds is composed of the sound-proofing index of the rough floor (equivalent footfall sound-proofing index $TSM_{eq}$) and the footfall sound improvement index resulting from an improvement measure and is determined according to the following equation:

$$TSM = TSM_{eq} + VM - 2 \text{ dB}$$

The footfall sound-proofing index TSM is calculated according to the equation:

$$TSM = 63 \text{ dB} - L_{s,w}$$

$L_{s,w}$ is the equivalent evaluated standard footfall sound level of the rough floor.

The footfall sound-proofing index is measured acoustically as a footfall sound reduction according to DIN EN 20140 (former DIN 52210). The sound level is in this case measured in decibels (dB).

The known footfall sound improvement measures are:

- single-sheet wooden beam floor with intermediate filling
- two-sheet floors, i.e. insulating layers between the covering for walking on and wooden beams and cladding on the under side
- floating screed with insulating materials having the lowest possible dynamic rigidity of the insulating materials
- wooden floorboards laid in a floating manner with a TS-insulating layer
- springy supports
- walls and floor with a large weight per square meter
- low-noise installation elements/insulation between the installation and building work carried out consequently
- drawing-in of an sub-floor with spring attachment on the sub-floor Sound insulation to prevent the transmission of footfall sound is required in:

- Basement floors (laundry rooms, drying rooms)
- Residential dividing floors
- Floors above/below open garages, passageways
- Floors below attics.

The inhabitants of apartments should be protected from the transmission of noise from other apartments.

Therefore, good sound insulation should enable the occupants of a house or apartment to develop their own personalities to the full in their own four walls, without the neighbours becoming the unintentional witness to every daily comment. For an apartment's dividing floor, up to the end of the eighties, there was a minimum requirement for a footfall sound-proofing with the footfall sound-proofing index TSM=0 dB. According to DIN 4109 (sound-proofing in building construction), November 1989 issue and the Association of German Engineers Guideline 4100: Sound-proofing of apartments, an increased footfall sound-proofing index TSM is required. The relationship between the noise level and evaluated standard footfall sound level (and at the same time footfall sound-proofing index) is shown approximately by FIG. 1.

In the DIN-standard 4109, November 1989 Issue, for the first time values were given for the necessary footfall sound-proofing of stairs in multi-storey apartment building. In this case, requirements for an evaluated standard footfall sound level of 58 dB (footfall sound-proofing index of 5 dB) were fixed. However, in the long term, the increased evaluated standard footfall sound levels $L'_{n,w}$ (footfall sound-proofing index TSM) recommended for the transmission of footfall sound should be aimed at, as is apparent from the following table:

| | | Necessary footfall sound-proofing | | | |
| | | reduced sound-proofing | | sound-proofing to be aimed for | |
| Column Lines | 1 sound-proofing step | 2A $L'_{n,w}$*) in dB | 2B (TSM)*) in dB | 3A $L'_{n,w}$*) in dB | 3B (TSM)*) in dB |
| --- | --- | --- | --- | --- | --- |
| 1 | I | 58 | (5) | 53 | (10) |
| 2 | II | 53 | (10) | 46 | (17) |
| 3 | III | 46 | (17) | 39 | (24) |

*) Between TSM and $L'_{n,w}$ the following relationship exists: TSM = 63 dB − $L'_{n,w}$.

The minimum requirements of the evaluated building-sound-proofing index and the footfall sound-proofing index for important structural components of apartment blocks are reproduced in the Table 1.5, columns 3 and 4, DIN EN 20140 T3. The DIN-standard 4109 furthermore includes minimum requirements for further structural components for increased sound-proofing as well as guidelines for sound-proofing in the specific residential and working area. Worldwide, millions of apartments from early years of construction require renovation. There is also an enormous need to catch up on renovation. In the course of these measures, the continuously increasing requirements as regards sound-proofing must also be taken into consideration. The achievement of a footfall sound-proofing measure is only possible due to additional measures on the rough concrete floors and/or the wooden beam constructions. In the discovery of the footfall sound-proofing of floor constructions, only the floating screed and possibly laid foundations for floor coverings should be included in the calculation, however not soft springy upper floor coverings, since these can be exchanged by the user at any time and their degree or improvement does not remain constant on account of the wear which occurs.

The subject matter of DE 197 31 485 A1 is a method for laying floor coverings on sub-floors, in which for the sub-floors, one mixes a primer known per se (for example from DE-OS 26 26 126) in the form of a dry mortar mixture based on Portland cement, aluminous cement and calcium sulphate (expanding cement of type K), which is suitable for the formation of an Ettringit phase, with 2, 3, 4, 5-tetrahydroxyadipic acid as the liquefier in a quantity of 0.15 to 1.0 percent by weight and a mixture of latexed ground hard fibres, aminoacid polycondensation fibres and polyurethane foam in a quantity of 10 to 20 percent by weight, in each case with respect to the total dry mortar mixture, and one elastifies the dry mortar obtained in this way with a saponification-resistant dispersion of a butadiene-styrene-copolymerisate containing carboxyl groups, with extremely low emission values in a quantity of 4 to 8 percent by weight, in each case with respect to the total dry mortar mixture, one dilutes the mixture obtained with water, applies it to the sub-floor and allows it to dry and then one applies to the rapid-setting thin-layer screed obtained in this way having an improved footfall sound-proofing index (TSM), a low-emission (max. 300 $\mu g/m^3$), solvent-free synthetic resin dispersion with a water content of not more than 15 percent, with a content of a tackifier, based on natural resin ester and/or synthetic resins and with a content of an emulsifier based on sulphated and/or sulphonated hydroxy-octadecene acids and/or their high molecular triglycerides of 1 to 5 percent by weight, with respect to the synthetic resin dispersion, in which case the tackifier is adjusted to a pH-value of 4 to 6 and then one lays the covering thereon.

Now it was found that in place of part of the latexed, ground hard fibres, glass fibres, polymerisate fibres, such as polyacrylonitrile, polyamide, polyester or polypropylene fibres, or mixtures thereof, can be used s the fibre components of the dry mortar.

Furthermore, it was found hat due to the fact that the mortar mixture diluted with water, applied to the sub-floor and left to dry, is roughened in the dry state and in this way the filler/fibre mixture is set free from the casing constituted by the cement mortar, a purely mechanical carpet fixing can be achieved, if the carpet covering is laid on the screed treated in this way and rubbed lightly. The sticking of screed and carpet covering deemed necessary hitherto can be dispensed with and if necessary the floor covering can be removed more easily.

Furthermore it was found that the fibres can also be used outside the screed and in this case sticking is also superfluous.

SUMMARY OF THE INVENTION

The object of the invention is therefore the usefulness of more easily accessible fibre materials as well as the use of the fibres to achieve an adhesion of the floor covering to the sub-floor without sticking, so that it can be removed easily.

The subject matter of the invention is a method for laying floor coverings on sub-floors, in which for the sub-floors a primer known per se in the form of a dry mortar mixture based on Portland cement, aluminous cement and calcium sulphate (expanding cement of type K), which is suitable for the formation of an Ettringit phase, is mixed with 0.15 to 1.0 percent by weight of 2, 3, 4, 5-tetrahydroxyadipic acid as a liquefier and 10 to 20 percent by weight, in each case with respect to the total dry mortar mixture, of a mixture of a) latexed ground hard fibres, b) glass fibres and/or polymerisate fibres, c) aminoacid polycondensation fibres and d) polyurethane foam and the dry mortar obtained in this way is elastified with a saponification-resistant dispersion of a butadiene/styrene-copolymerisate containing carboxyl groups, having extremely low emission values (max. 300 $\mu g/m^3$| in a quantity of 4 to 8 percent by weight, with respect to the total dry mortar mixture, the mixture obtained in this way is diluted with water, applied to the sub-floor and left to dry and then there is applied to the rapid-setting thin layer screed obtained in this way having a footfall sound-proofing index (TSM) improved to 12 dB, a low-emission (max. 300 $\mu g/m^3$), solvent-free synthetic resin dispersion with a water content of not more than 15 percent, with a content of a tackifier based on natural resin esters and/or synthetic resins and with a content of an emulsifier based on sulphated and/or sulphonated hydroxy-octadecene acids and/or their high molecular triglycerides of 1 to 5 percent by weight, with respect to the synthetic resin dispersion, the tackifier being adjusted to a pH-value of 4 to 6 and then the floor covering is laid thereon.

Furthermore, subject matter of the invention is a modification of the method for laying floor coverings on sub-floors, in which for the sub-floors one mixes a primer known per se, in the form of a dry mortar mixture based on Portland cement, aluminous cement and calcium sulphate (expanding cement of type K), which is suitable for the formation of an Ettringit phase, with 0.15 to 1.0 percent by weight, with respect to the total dry mortar mixture of 2, 3, 4, 5-tetrahydroxyadipic acid as a liquefier, one dilutes it and applies it to the sub-floor and leaves it to dry and then one applies an aqueous synthetic resin dispersion with a water content of not more than 15 percent and then lays the floor covering thereon or the primer to which 2, 3, 4, 5-tetrahydroxyadipic acid was added, is diluted with water, the mixture is applied to the sub-floor and a mechanical, adhesive-free bond between the floor covering and sub-floor is brought about by providing a mixture projecting from the sub-floor, which mixture consists of a) latexed ground hard fibres, b) 0 to 100%, with respect to the weight of the hard fibres, of glass fibres and/or polymerisate fibres, c) aminoacid polycondensation fibres and d) polyurethane foam.

DETAILED DESCRIPTION OF THE INVENTION

Figure 1:
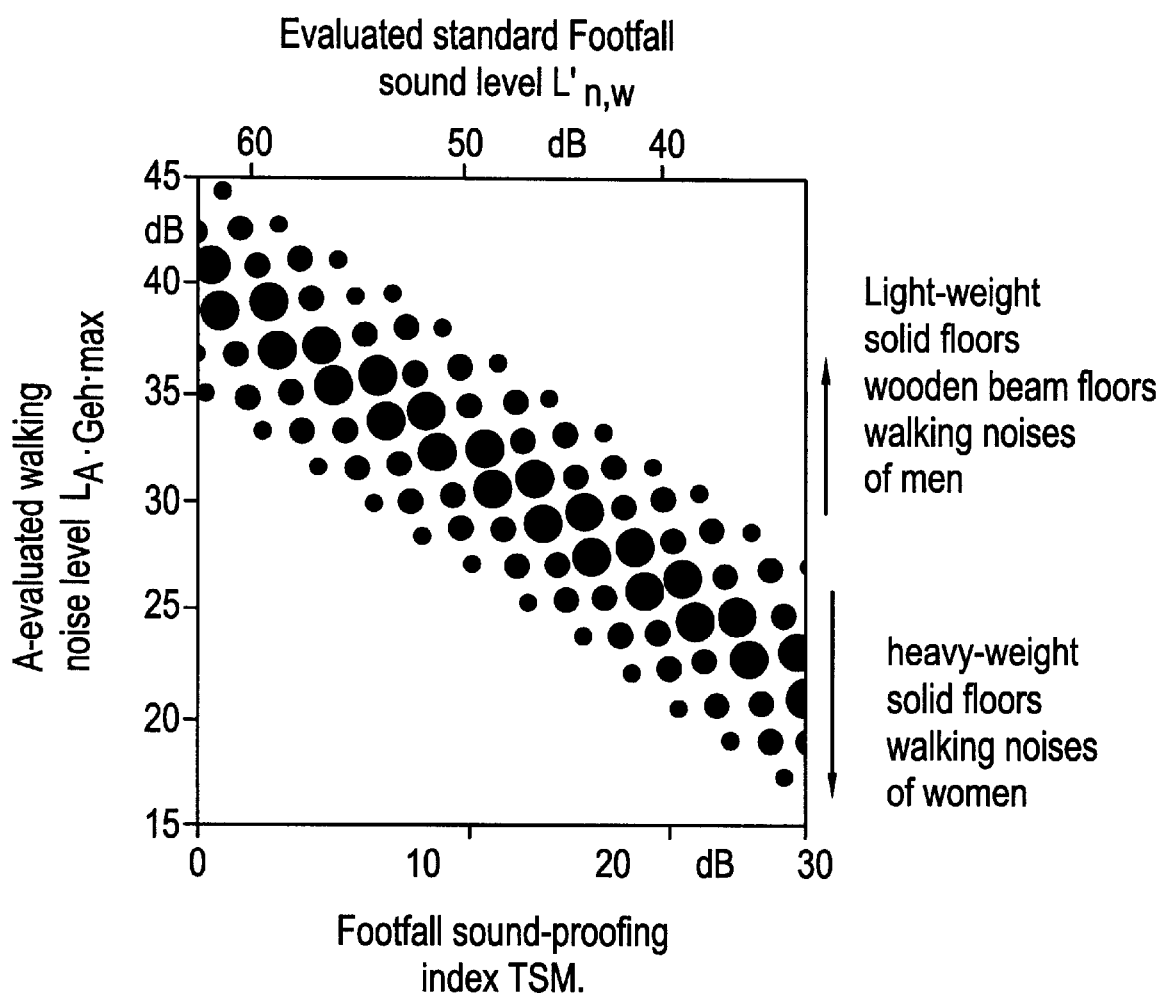
FIG. 1 is a graph of noise level vs. evaluated footfall sound level for various floors.

The provision of fibres projecting from the sub-floor can be realised in different ways.

One solution consists in that one achieves the bond between the floor covering and sub-floor due to the fact that one mixes the dry mortar mixture to which the liquefier has been added, with 10 to 20 percent by weight, with respect to the total dry mortar mixture, of the fibre mixture and one elastifies the dry mortar obtained in this way, with a saponification-resistant disperison of a butadiene/styrene-copolymerisate containing carboxyl groups, having extremely low emission values (max. 300 $\mu g/m^3$) in a quantity of 4 to 8 percent by weight, with respect to the total dry mortar mixture, one dilutes the mixture obtained with water, applies it to the sub-floor and allows it to dry and then one roughens the fast-setting, thin-layer screed obtained in this way, one removes dust from the roughened surface and then one lays the floor covering thereon and rubs it lightly.

A further solution is that one achieves the bond between the floor covering and sub-floor due to the fact that one dilutes with water the dry mortar mixture to which the liquefier has been added, one applies it to the sub-floor and allows it to dry and then one applies to the fast-setting, thin-layer screed obtained in this way, an aqueous, non-ionogenic, stabilised, low-emission, saponification-resistant dispersion of a butadiene/styrene-copolymerisate containing carboxyl groups having a content of the fibre mixture of 10 to 30% by weight, with respect to the fibre-free dispersion, in a layer thickness of 0.5 to 2 mm and one allows it to dry and one lays on the dried surface the floor covering comprising a fleece backing having reliable adhesion and one rubs it lightly.

In a further solution, one achieves the bond between the floor covering and sub-floor due to the fact that one dilutes with water the dry mortar mixture to which the liquefier has been added, applies it to the sub-floor and allows it to dry and then one applies to the quick-setting thin-layer screed obtained in this way, an aqueous, non-ionogenic, stabilised, low-emission, saponification-resistant dispersion of a butadiene/styrene-copolymerisate containing carboxyl groups, in a layer thickness of 0.5 to 2 mm and one leaves it to dry for at least 24 hours, one spreads in the dispersion, which is still capable of flowing, the fibre mixture in a quantity of 600 to 800 g/m$^2$ with respect to the weight of the fibre-free dispersion used for the respective surface, one allows the dispersion to dry and one removes loose fibres from the dried surface (approximately 300 to 400 g/m$^2$). After the spreading and drying of the primer, a low-emission synthetic material dispersion with butadiene/styrene-copolymerisate containing carboxyl groups is rolled on or sprayed on with a suitable appliance. The coating serves the inner consolidation of the material applied and guarantees suitability for loom rollers in accordance with the DIN. Then the floor covering having a fleece backing providing secure adhesion is laid thereon and rubbed lightly.

Finally, one brings about the bond between the floor covering and sub-floor in a further solution due to the fact that one dilutes with water the dry mortar mixture to which the liquefier has been added, applies it to the sub-floor, spreads the fibre mixture, still before drying, after priming, and after the drying of the primer and removing of the excess proportion of fibres, one applies an aqueous, non-ionogenic, stabilised, low-emission, saponification-resistant dispersion of a butadiene/styrene-copolymerisate containing carboxyl groups in a layer thickness of 0.5 to 2 mm and one removes loose fibres from the dried surface and then one lays thereon the floor covering comprising a fleece backing providing reliable adhesion and one rubs it lightly.

The invention furthermore relates to the primer dry substance (dry mortar) used in the said methods, as well as the dispersion of a butadiene/styrene-copolymerisate used having a fibre content.

As the polymerisate fibres, polyacrylonitrile, polyamide, polyester or polypropylene fibres or mixtures thereof are preferably used. Their staple length amounts to 1 to 6 mm. If polymerisate and/or glass fibres are used in addition to the hard fibres, their proportion amounts to up to 100% of the weight of the hard fibres. The weight ratio of hard fibres, possibly mixed with glass and/or polymerisate fibres, to aminopolycondensation fibres and polyurethane foam may vary within wide limits.

Due to the joint use of glass and/or polymerisate fibres, the roughness of the fibre constituents is increased, which increases the mechanical adhesion of the carpet floor covering to the sub-floor (resistance to displacement).

Due to the treatment of the filer/fibre mixture with synthetic latex and/or highly elastic, saponification-resistant butadiene/styrene-copolymerisates containing carboxyl groups and/or acrylic acid mixed esters-polymerisates (latexing), the fibres obtain more spring elasticity. The grinding of the hard fibre basic material is necessary in order to open the outer casing of these fibres (as in the case of flax fibre for producing linen) or to destroy it and thus to achieve a continuous, i.e. impregnating fibre-latexing of the actual fibre portions. Despite the grinding, the character of the fibre (fibre length: 1 to 6 mm) is retained. Examples of hard fibres (DIN 60001/T) are hemp, kapok, coconut fibre or sisal. In addition, the ground hard fibres may be compressed after latexing. The polyurethane foam may originate from ground old polyurethane foam sheets, thus from production waste. Grinding or latexing of the glass or polymerisate fibres possibly jointly used, does not take place.

The mineral dry mortar according to the invention obtained and possibly provided with fibres and filler is mixed, before processing, possibly with 4 to 8 percent by weight of an aqueous, saponification-resistant butadiene/styrene-copolymerisate disperison containing carboxyl groups, having extremely low emission values, i.e. emission values of max. 300 $\mu g/m^3$ on the tenth day. The mixture obtained or the original mineral dry mortar is then diluted with approximately 15 to 20 percent water, applied to the sub-floor and left to dry. The application thickness amounts on wood floorboard supports in the composite material to 10 to 20 mm and as a self-spreading, self-supporting thin screed on a separating layer (PE-film) to 20 to 30 mm, for example on rough concrete. Other suitable sub-floors are for example composite materials and floating screeds. The footfall sound improvement index, determined according to the aforementioned DIN EN 20140, on a 16 centimeter thick steel concrete floor with a smooth surface was: footfall sound improvement index dLw=12 dB
improvement index VM=12 db.

If no improvement in the footfall sound is required, the mortar mixture is applied in a thickness of 5 to 24 mm.

After 18 hours drying time, the residual moisture (residual domestic moisture) of the mixture according to the invention amounts to max. 3 CM-% (rapid determination of moisture according to the calcium carbide method), so that any floor covering can be reliably stuck with the dispersion adhesives according to DE 196 20 176 A1, which are low in water, low in emissions and solvent-free (also free from components having a high boiling points) and a hard floor covering (parquet, laminate, ceramics) can be stuck reliably with resilient thin-bed mortar adhesives.

If no sticking of the carpet floor covering to the sub-floor is intended, then according to one embodiment of the method of the invention, the mortar is roughened after drying. The floor covering is then laid and merely rubbed on lightly.

In another adhesive-free modification of the method according to the invention, an aqueous, non-ionogenic, stabilised, saponification-resistant dispersion of a butadiene/styrene-copolymerisate containing carboxyl groups is applied by a roller, primer-smoothing trowel or similar application device, to the dry primer, which disperison is known from DE 19731485A1 and according to the method described therein is sued as elasticizing means. This dispersion contains 45 to 75%, preferably 70% copolymerisate, is stabilised with a dispersing agent, such as 2-amino-2-methyl-1-propanol and has extremely low emission values of max. 300 µg/m³ on the tenth day.

According to the invention the dispersion furthermore contains 10 to 30%, with respect to the weight of the dispersion, of a mixture of a) latexed, ground hard fibres, b) 0 to 100%, with respect to the weight of the hard fibres, of glass fibres and/or polymerisate fibres, c) amino acid polycondensation fibres and d) polyurethane foam. The dispersion filled in this way is applied to the primer sub-floor in a layer thickness of 0.5 mm to 2 mm and left to dry.

As an alternative, in a further adhesive-free embodiment, the dispersion can also be applied without a content of fibre material. Then, after at least 24 hours drying, when it is still in a state capable of flowing, fibre material is spread thereon. Its quantity of 10 to 30% is then related to the weight of the dispersion applied to the respective surface to be treated. After spreading, the fibre material will sink partly into the still viscous dispersion layer and the entirety is left to dry. After thorough drying, in the embodiment of the method according to the invention with spreading of the fibres, the fibres which have not bonded in the dispersion are removed by suction. After spreading and drying of the primer, a low-emission synthetic dispersion with butadiene/styrene-copolymerisate containing carboxyl groups is rolled or sprayed on with a suitable appliance. The coating serves the internal consolidation of the material applied and guarantees suitability for loom rollers in accordance with the DIN.

According to a further embodiment of the method according to the invention, the dry mortar diluted with water is applied to the sub-floor suitable for laying and immediately after priming, irrespective of the application thickness or levelling thickness, the fibre mixture is spread thereover in a quantity of 600 to 800 g/m². Then, after drying of the primer, the excess quantity of loose fibres to the amount of approximately 50% of the quantity of fibres spread, is removed by suction or sweeping and the low-emission synthetic material dispersion of a butadiene/styrene-copolymerisate containing carboxyl groups is roller or sprayed with a suitable appliance onto the dried primer surface "studded" with the fibres. The coating serves the internal consolidation of the material applied and guarantees a suitability for loom rollers according to the DIN.

Then the floor covering is laid and rubbed only lightly. In the types of laying mentioned lastly, the carpet floor covering is kept in shape without sticking, so that a displacement is no longer possible over relatively large laying surfaces. For this purpose, the floor covering has a backing providing reliable adhesion, for example a fleece backing providing reliable adhesion, which consists of a needle fleece of textile fibres, such as polypropylene, polyester, polyamide, wool, cotton or mixtures thereof and is fixed by sticking with latex or fusion adhesives to the rear side of the floor covering.

When it is not a question of achieving high footfall sound-proofing instead of the above-mentioned primer, on deformation-resistant sub-floors (for example concrete, screeds etc.) a commercially available cement-like Ettringit-forming but rigidly hardening primer can be used, to which, as mentioned above, the dispersion is applied and the floor covering is applied.

These new ways of laying carpet floor covering, in which a regular hooking between the floor covering and mortar surface takes place, represent the first purely mechanical fixing of carpets.

An exchange of the floor covering is possible without problems without damage to the sub-floor. The use of this new laying method is ideal for rented apartments, hotels and private residences.

This laying method simultaneously offers freedom from adhesive and thus maximum care of the environment, optimum working protection for the layer, the lowest emission values and outstanding floor covering stability (no change of shape due to water or other solvents from adhesives).

The basis of the new primer is the Ettringit formation known for example from DE-OS 26 26 126, due to the expanding cement of type K, namely Portland cement, aluminous cement and calcium sulphate. In this case, the known additives, the mineral fillers, sand and/or carbonates as well as redispersible synthetic powders, such as polyvinlyacetate, polyvinylalcohol and/or their co-polymerisates and/or acrylicacid esters, are added.

The liquefier to be used according to the invention, namely 2, 3, 4, 5-tetrahydroxyadipic acid, which acts at the same time as a setting retarder, can be replaced up to 50% by other liquefiers based on hydroxycarboxylic acids and/or their alkaline salts, such as citric acid, citrates, tartaric acid, tartrates, gluconic acid, gluconates, malic acid and/or lactic acid. To the extent as mentioned above, recycling filler-fibre mixtures are incorporated in these primer mortars.

Due to the extremely high liquefaction of the mortar, the primer particles adhere to the fibres and the other ground filler particles due to Van der Waals forces, electrostatic forces and liquid bridges. Due to the latexing of the fibre materials after grinding and possibly before the compression of the sound-proofing material mixture, the smoothing process of the mortar according to the invention is surprisingly not disturbed.

To increase the hydrophobic property of the materials according to the invention, the addition of 2, 5-furandicarboxylic acid furthermore takes place. Free calcium ions from the expanding cement-K-base are bonded in this way to the carboxyl groups, so that a further increase in the liquefaction and/or an increased hydrophobic property is achieved and partial dissolving and detachment of the primer surface in the micro range due to the action of water from higher water-based, solvent-free dispersion adhesives are reliably prevented.

The advantages of the invention are as follows:
(1) Use of a mineral expanding cement to the type K, known per se, with the addition of additives having a liquefying action based on 2, 3, 4, 5-tetrahydroxyadipic acid and
(2) an addition of 2, 5-furandicarboxylic acid to produce a water-repelling action
(3) Incorporation of a mixture of latexed, ground hard fibres, which can be mixed with glass fibres and/or polymerisate fibres, aminoacid polycondensation fibres and polyurethane foam. This consequently makes possible a purely mechanical fixing of a carpet; thus an increase in the environmental friendliness on account of the absence of sticking; nevertheless stable fixing of the floor covering with easy removability;
(4) Self-supporting, self-spreading thin screed with a minimum of 10 mm to maximum 30 mm application thickness of a PE-separating film sheet;
(5) Rapid drying of the primer with a maximum of 3 CM-% residual moisture after 48 hours with immediate ability to lay all known elastic floor coverings (PVC, rubber, polyolefin, linoleum, carpet) and hard floor coverings (parquet flooring, laminate, ceramics) with new dispersion adhesives containing little water and having the lowest emission level of maximum 300 µg/m³ (measurement on the 10th day);
(6) Footfall sound improvement according to DIN 4109 and DIN EN 20140 with a hardened 25 mm mortar layer thickness according to the invention with dLw=12 dB and VM=12 dB;

(7) Improvement of the thermal insulation in comparison with conventional cement screeds;

(8) Freedom from odours and emissions. Due to this, the method according to the invention is environmentally friendly, easy to process and easy to use, in an optimum manner;

(9) The thin-layer, fast-setting mortar equalization according to the method of the invention adheres in a layer thickness of 5 mm to 30 mm both to old floor coverings, without the latter having to be torn up, by laying a PE-sheet having a thickness of for example 0.1 to 0.2 mm, as well as on wood floorboarding or rigid cement under-floors. The production of the dry mortar and of the aqueous synthetic dispersion without fibres is simpler.

The following examples illustrate the invention:

EXAMPLE 1

| | |
|---|---|
| 79% by weight | Primer based on the known expanding cement of type K without liquefier and retarder |
| 0.5% by weight | 2, 3, 4, 5-tetrahydroxyadipic acid |
| 0.5% by weight | 2, 5-furandicarboxylicacid |
| 20% by weight | latexed, ground hard fibres, aminoacid-polycondensation fibres, PU-foam (1:1:1) |
| 100% by weight | |

100 kg of the thin-layer screed mortar of the invention are mixed with 8 kg of a 50 percent, non-ionogenic, stabilised, saponification-resistant dispersion of a butadiene/styrene-copolymerisate containing carboxyl groups and with 32 liters of tap water to produce a self-levelling thin screed mortar and applied at between 10 and 30 mm maximum to the above-mentioned sub-floors.

The above example, calculated for:

All constituents without mixing water=100%

| | |
|---|---|
| 92.6% by weight | dry mortar according to the invention including fibres and additives |
| 7.4% by weight | of a 50 per cent dispersion of a butadiene/styrene-copolymerisate containing carboxyl groups |
| 100% by weight | |

100 kg of the mortar elastified with the said dispersion are mixed with 20.4 liters of tap water to produce the self-levelling mortar and applied in the said layer thicknesses to the aforementioned sub-floors. After priming with the smoothing trowel, a spiked roller is pulled through the still fresh mortar. After 12 hours drying, the mortar surface is roughened mechanically with a rotating steel brush and the dust is removed by suction. Due to this treatment, the filler/fibre mixture is exposed form the cement mortar casing, whereby the fibres are simultaneously raised vertically and the fibre structure worked-in is raised. Already, during the drying process, the special fibres are standing up. The roughening (grinding) increases this effect. First of all a carpet is laid on the sub-floor prepared in this way and rubbed lightly. It remains resistant to displacement. On the other hand, the laying of a parquet flooring provided with a fleece backing takes place.

This also remains resistant to displacement.

EXAMPLE 2

The method according to Example 1 is repeated with the variation that 40% by weight of the latexed, ground hard fibres are replaced by a 1:1-mixture (weight) of glass fibres and polyacrylonitrile fibres. After laying the carpet, the latter likewise remains resistant to displacement.

EXAMPLE 3

| | |
|---|---|
| 79% by weight | Binder based on the known expanding cement of type K without liquefier and retarder |
| 0.5% by weight | 2, 3, 4, 5-tetrahydroxyadipic acid |
| 0.5% by weight | 2, 5-furandicarboxylicacid |
| 20% by weight | latexed, ground hard fibres, up to 30% replaced by a 1:1-mixture (weight) of glass fibres and polypropylene fibres (33.3%), aminoacid-polycondensation fibre (33.3%), PU-foam (33.3%) |
| 100% by weight | |

100 kg of thin layer screed mortar of the invention are mixed with 89 kg of a 50 percent, non-ionogenic, stabilised, saponification-resistant dispersion of a butadiene/styrene-copolymerisate containing carboxyl groups and mixed with 22 liters of tap water to produce a self-levelling thin screed mortar and applied to the above-mentioned sub-floors at a thickness of between 10 to a maximum of 30 mm.

The above example, calculated for:

All constituents without mixing water=100%

| | |
|---|---|
| 92.6% by weight | dry mortar according to the invention including fibres and additives |
| 7.4% by weight | of a 50 per cent dispersion of a butadiene/styrene-copolymerisate containing carboxyl groups |
| 100% by weight | |

100 kg of the mortar elastified with the said dispersion are mixed with 20.4 liters tap water to produce the self-levelling mortar and applied in the said layer thicknesses to the said sub-floors.

After 48 hours, elastic floor coverings can be stuck with absolutely solvent-free, low-emission (below 300 $\mu g/m^3$) and environmentally friendly dispersion adhesives, which are low in water, according to DE 196 20 176 A1. Subsequent to the application of the adhesive, the floor covering is applied.

EXAMPLE 4

| | |
|---|---|
| 98.0% by weight | Primer based on the known expanding cement of type K, consisting of Portland cement, aluminous cement and calcium sulphate, without liquefier and retarder of conventional type |

-continued

| | |
|---|---|
| 1.0% by weight | 2, 3, 4, 5-tetrahydroxyadipic acid |
| 1.0% by weight | 2, 5-furandicarboxylic acid |
| 100.0% by weight | |

100 kg of this primer are mixed with 25 liters tap water to produce a self-levelling mortar and applied with an application thickness of 5 to 10 mm maximum as a primer to sub-floors and left to dry.

Separate from this, a dispersion containing fibres is produced from:

| | |
|---|---|
| 70.0% by weight | of a 70 per cent non-ionogenic, stabilised, low-emission, saponification-resistant, aqueous dispersion of a butadiene/styrene-copolymerisate containing carboxyl groups and |
| 30% by weight | latexed, ground hard fibres, aminoacid-polycondensation fibres, PU-foam (1:1:1) |
| 100% by weight | |

The dispersion is applied in a layer thickness of 0.5 to 2.0 mm to the dried primer material having domestic moisture (maximum 3 CM-%), with the smoothing trowel or lambskin roller. After evaporation of the dispersing water of the dispersion (approximately 24 hours) first of all the laying of a carpet with applied fleece backing having reliable adhesion takes place. The carpet is rubbed lightly. It remains resistant to displacement. On the other hand, the laying of parquet flooring provided with a fleece backing takes place. This also remains resistant to displacement.

EXAMPLE 5

The method according to Example 4 is repeated with the variation that 40% by weight of the latexed, ground hard fibres were replaced by a 1:1-mixture (weight) of glass fibres and polyacrylonitrile fibres. After laying of the carpet, the latter likewise remains resistant to displacement.

EXAMPLE 6

Example 4 is repeated with the variation that the aqueous dispersion of a copolymerisate of butadiene and styrene, mentioned in Example 4, but without a fibre content, is applied to the dried primer material. After being left to dry for 24 hours, the fibre mixture mentioned in Example 4 in the production of the dispersion containing fibres, is spread in the dispersion which is still viscous. After thorough drying of the total application, remaining loose fibres are removed by suction. After the spreading and drying of the primer material, a low-emission synthetic dispersion with a butadiene/styrene-copolymerisate containing carboxyl groups is rolled or sprayed on with a suitable appliance. The coating serves the internal consolidation of the material applied and guarantees suitability for loom rollers in accordance with the DIN. The carpet is laid, as indicted in Example 4 and rubbed lightly. It remains resistant to displacement.

EXAMPLE 7

The fibre mixture mentioned in Example 4 in the production of the dispersion containing fibres, in a quantity of 600 to 800 g/m² is spread on the primer applied according to Example 4, still before drying. After the drying of the primer, the excess quantity of loose fibres, to the extent of 300 to 400 g/m² is removed by suction and the aqueous dispersion of a butadiene/styrene-copolymerisate containing carboxyl groups, mentioned in Example 4, is sprayed or applied with a lambskin roller in a quantity of 250 to 350 g/m². After thorough drying of the application, the laying and rubbing of the floor covering takes place. The floor covering is fixed in a stable manner and is resistant to displacement.

What is claimed is:

1. Method for laying floor coverings on sub-floors, comprising the steps of:

a) mixing a primer in the form of a dry mortar mixture based on Portland cement, aluminous cement and calcium sulphate, an expanding cement of type K, which is suitable for the formation of an Ettringite phase, with 0.15 to 1.0 percent by weight of 2,3,4,5-tetrahydroxyadipic acid as a liquefier and 10 to 20 percent by weight each, with respect to the total dry mortar mixture, of a mixture of a) latexed ground hard fibres, b) at least one of glass fibers and polymerizate fibers, c) aminoacid polycondensation fibers and d) polyurethane foam;

b) elastifying the primer with a saponification-resistant dispersion of a butadiene/styrene copolymerizate containing carboxyl groups having an emission value maximum of 300 $\mu g/m^3$ on day 10 in a quantity of 4 to 8 percent by weight with respect to the total dry primer mixture;

c) diluting the mixture obtained with water, applying it to a sub-floor and allowing it to dry to form a fast setting, thin-layer screed;

d) applying to the fast-setting, thin-layer screed having an improved footfall sound-proofing index (TSM), a solvent-free synthetic resin dispersion having a emission maximum of 300 $\mu g/m^3$, with a water content of not more than 15 percent, with a content of a tackifier based on at least one of natural resin esters and synthetic resins and with a content of an emulsifier based on at least one of sulfated and sulfonated hydroxy-octadecene acids and high molecular triglycerides thereof of 1 to 5 percent by weight, with respect to the synthetic resin dispersion, the tackifier being adjusted to a pH-value of 4 to 6; and e) laying a floor covering thereon.

2. Method according to claim 1, wherein a mechanical, adhesive-free bond between the floor covering and sub-floor is brought about by providing a mixture, projecting from the sub-floor, of a) latexed, ground hard fibers, b) 0 to 100%, with respect to the weight of the hard fibers, of at least one of glass fibres and polymerisate fibres, c) aminoacid polycondensation fibers and d) polyurethane foam.

3. Method according to claim 2, wherein the bond between the floor covering and subfloor is brought about by mixing the dry mortar mixture mixed with the liquefier, with 10 to 20 percent by weight, with respect to the total dry mortar mixture, of the fibre mixture and elastifying the dry mortar obtained in this way, with the saponification-resistant dispersion of a butadiene-styrene copolymerizate containing carboxyl groups, in a quantity of 4 to 8 percent by weight, with respect to the total dry mortar mixture, diluting the mixture obtained with water, applying the diluted mixture to the sub-floor and allowing it to dry and then roughening the fast-setting, thin layer screed, removing dust from the roughened surface and laying the floor covering thereon and rubbing it lightly.

4. Method according to claim 2, wherein the bond between the floor covering and subfloor is brought about by diluting with water the dry mortar mixture mixed with the liquefier, applying the diluted mixture to the sub-floor and allowing it to dry and then applying to the fast-setting, thin layer screed, having an improved footfall sound-proofing index (TSM), an aqueous, non-ionogenic, stabilized, low-emission, saponification-resistant dispersion of a butadiene/styrene-copolymerizate containing carboxylgroups, with a content of the fiber mixture of 10 to 30% by weight, with respect to the fiber-free dispersion, in a layer thickness of 0.5 to 2 mm and allowing it to dry, laying the floor covering having a fleece backing providing reliable adhesion thereon, and rubbing the floor covering lightly.

5. Method according to claim 2, wherein the bond between the floor covering and subfloor is brought about by diluting with water the dry mortar mixture mixed with the liquefier, applying it to the sub-floor and allowing it to dry, and then applying to the fast-setting, thin layer screed, having an improved footfall sound-proofing index (TSM), an aqueous, non-ionogenic, stabilized, low-emission, saponification-resistant dispersion of a butadiene/styrene-copolymerizate containing carboxyl groups, in a layer thickness of 0.5 to 2mm and allowing it to dry for at least 24 hours, spreading in the dispersion, which is still capable of flowing, the fiber mixture in a quantity of 10 to 30%, with respect to the weight of the fibre-free dispersion used for the respective surface, allowing the dispersion to dry and removing loose fibres from the dried surface and then laying thereon a floor covering comprising a fleece backing providing reliable adhesion, and rubbing it lightly.

6. Method according to claim 2, wherein the bond between the floor covering and subfloor is brought about by diluting with water the dry mortar mixture mixed with the liquefier, applying it to the sub-floor, spreading on the fiber mixture, before drying, after priming, and after the drying of the primer material and removable of excess fibers, applying an aqueous, non-ionogenic, stabilized, low-emission, saponification-resistant dispersion of a butadiene/styrene-copolymerisate containing carboxyl groups, in a layer thickness of 0.5 to 2 mm, and then laying thereon a floor covering comprising a fleece backing providing reliable adhesion, and rubbing it lightly.

7. Method according to claim 3, wherein the non-ionogenic, stabilised, low-emission, saponification-resistant dispersion of a butadiene/styrene-copolymerizate containing carboxyl groups is applied on a conventional cement, Ettringite-forming primer material, which hardness to become rigid.

8. Method according to claim 1, wherein the liquefier comprises a 2, 3, 4, 5-tetrahydroxyadipic acid, which is replaced up to 50 percent by weight by at least one material selected from the group consisting of citric acid, tartaric acid, gluconic acid, malic acid, lactic acid, and alkali salts of said acids.

9. Method according to claim 1, wherein 0.1 to 1.0 percent by weight of a 2,5-furandicarboxylic acid is incorporated in the primer material.

10. Method according to claim 1, wherein the hard fibers comprise coconut fiber, sisal or hemp fiber.

11. Method according to claim 1, wherein the hard fibers have been compressed after grinding and latexing.

12. Method according to claim 1, wherein in the latexed hard fibres, the latex is replaced completely or partially by a butadiene/styrene copolymerizate containing carboxyl groups, by a acrylic acid mixed ester-polymerizate, or by a mixture of both.

13. Method according to claim 1, wherein the polymerizate fibers comprise polyacrylonitrile, polyamide, polyester or polypropylene fibers.

14. Method according to claim 1, wherein the non-ionogenic, stabilized, low-emission, saponification-resistant dispersion of a butadiene/styrene-copolymerisate containing carboxyl groups comprises 2-amino-2-methyl-1-propanol in a quantity of 0.15 to 1.0 percent by weight as a stabilizing agent.

* * * * *

UNITED STATES PATENT AND TRADEMARK OFFICE
CERTIFICATE OF CORRECTION

PATENT NO. : 6,250,043 B1  
DATED : June 26, 2001  
INVENTOR(S) : Ernst Dieckmann et al.

Page 1 of 1

It is certified that error appears in the above-identified patent and that said Letters Patent is hereby corrected as shown below:

<u>Title page,</u>
After Item "[73], Assignee:" change "Wulffe GmbH U. CO." to
-- Wulff GmbH U. CO. --.

Signed and Sealed this

Twelfth Day of February, 2002

Attest:

JAMES E. ROGAN  
*Attesting Officer*  *Director of the United States Patent and Trademark Office*